J. BROTSCHNEIDER.
TIRE PROTECTOR.
APPLICATION FILED JUNE 5, 1913.
1,071,695.
Patented Sept. 2, 1913.
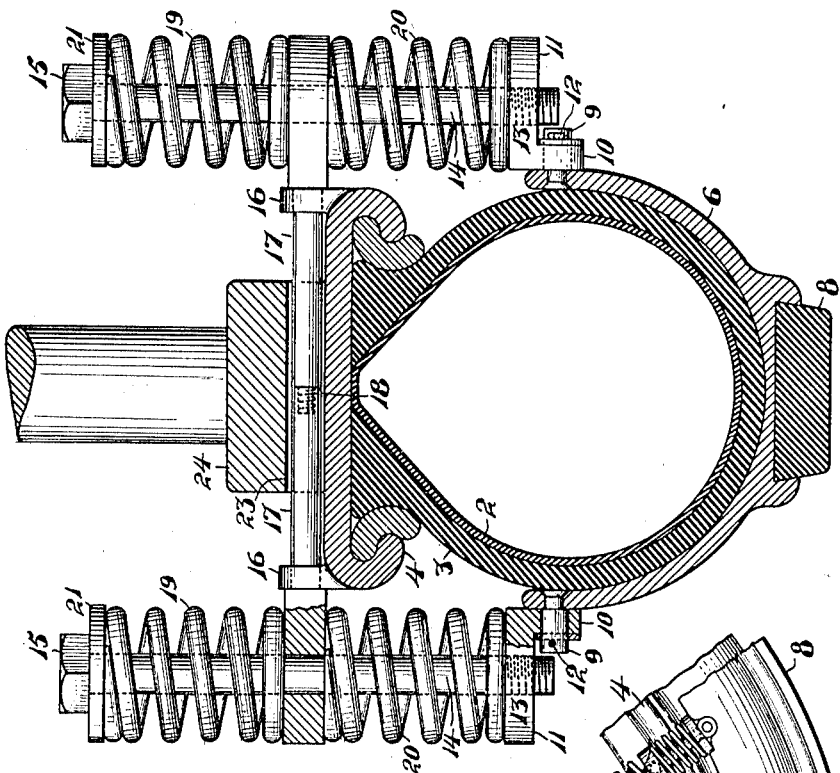
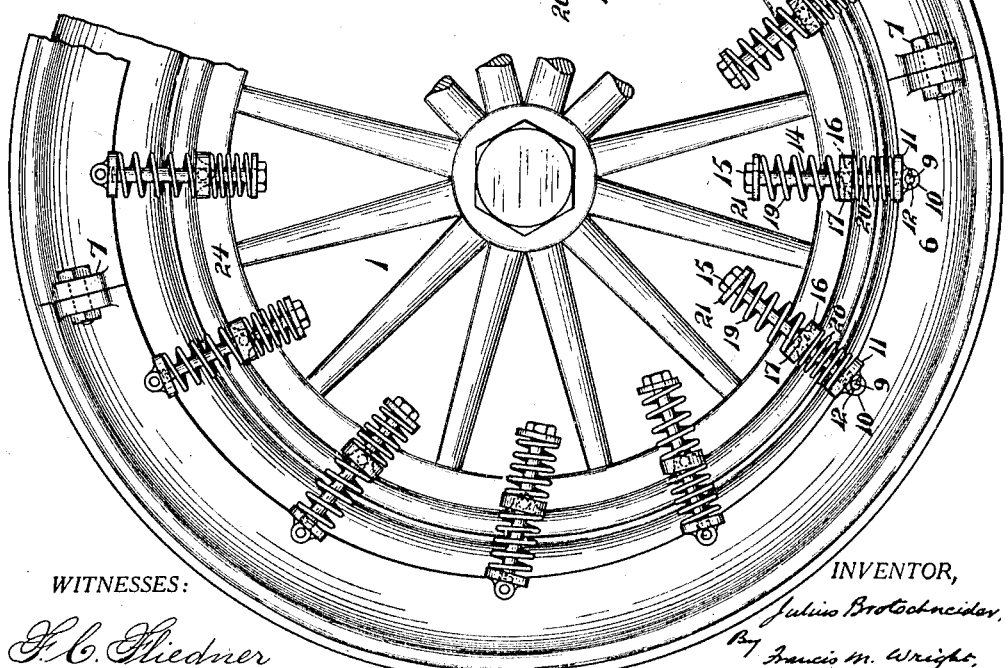

UNITED STATES PATENT OFFICE.

JULIUS BROTSCHNEIDER, OF SAN FRANCISCO, CALIFORNIA.

TIRE-PROTECTOR.

1,071,695.   Specification of Letters Patent.   Patented Sept. 2, 1913.

Application filed June 5, 1913. Serial No. 771,862.

*To all whom it may concern:*

Be it known that I, JULIUS BROTSCHNEIDER, a subject of the Emperor of Austria-Hungary, residing at San Francisco, in the county of San Francisco and State of California, have invented new and useful Improvements in Tire-Protectors, of which the following is a specification.

This invention relates to improvements in protectors for pneumatic tires, the object of the invention being to provide a device of this character which, while affording complete protection to the tire, will at the same time have great resiliency with reference to the center of the wheel, will support the pneumatic tire against sidewise movement when turning corners, and will transmit the driving power from the center to the surface of the protector in contact with the ground.

In the accompanying drawing, Figure 1 is a broken side view of a wheel, constructed in accordance with my invention, as it would appear when supporting a load; and Fig. 2 is an enlarged cross-sectional view of the rim tire and protector.

Referring to the drawing, 1 indicates a wheel, such as is used on automobiles, having an inner pneumatic tube 2, an outer 3, and a clencher rim 4.

6 indicates a metallic band, formed in two sections bolted together, as shown at 7, for the purpose of easy removal and replacement. Its cross-sectional form is semi-circular, except that the middle portion is formed with a wide groove to receive an annular tread 8 of rubber or other suitable material. However, this tread can be omitted if desired, and the band can be made of uniform thickness throughout its width. At uniform intervals in its circumference there are secured to the band on each side thereof, near its edges, pins 9 extending outwardly, or through holes formed in the lower members 10 of angle plates 11, and are secured therein by cotter pins 12. Into the upper or horizontal members 13 of said angle plates are screwed the lower ends of bolts 14 extending in a radial direction from the axis of the wheel, and having heads 15. The rim 4 of the tire differs from the ordinary rim in having on each side a series, corresponding to the series of pins 9 and bolts 14, of apertured lugs 16 extending inwardly, or toward the axis of the wheel. Through the apertures in said lugs extend the stems 17 of screw eyes, a stem on one side of the wheel having at its inner end external, and on the other side internal threads, so that their inner ends screw one into the other, as shown at 18. Said stems pass through holes 23 in the ordinary rim 24 of the wheel. The bolts 14 pass through the eyes of said screw eyes and coiled springs 19, 20, surround the bolts, and are compressed between the flat sides of the screw eyes and the angle plates 11 and washers 21 respectively, said washers 21 abutting against the heads 15 of said bolts. By reason of the fact that the screw eye stems pass loosely through the lugs 16, and can turn therein, each bolt 14 can, when arriving at a position level with the axis of the wheel, as shown in Fig. 1, assume a direction making an angle with the radius thereto, and consequently the resiliency of the tire protector with reference to the wheel is not impaired.

The advantages of the invention will be apparent from the description of its construction. The protector completely protects the pneumatic tire from puncture, and at the same time it has great resiliency with reference to the center of the wheel, and therefore to the load to be supported. The pneumatic tire is held very firmly against movement in a direction parallel with the axis of the wheel. At the same time, these bolts and springs afford a resilient means for transmitting the driving power from the driving shaft through the wheel to the surface of the protector in contact with the ground.

I claim :—

1. A protector for a pneumatic tire consisting of a sheet metal band surrounding the tire and of semi-circular cross section, a series of pins extending from each side of the protector, apertured angle plates secured to said pins, screw eyes having stems extending through apertures in the rim, bolts passing through said screw eyes and screwed into said angle plates, and coiled springs surrounding said bolts and compressed between the screw eyes and the angle plates and bolt heads respectively.

2. A protector for a pneumatic tire consisting of a sheet metal band surrounding the tire and of semi-circular cross section, a series of pins extending from each side of the protector, apertured devices pivoted to said pins, screw eyes having stems extending across the rim, bolts passing through said screw eyes and screwed into said devices, and coiled springs surrounding said bolts and compressed between the screw eyes and the devices and bolt heads respectively.

3. A protector for a pneumatic tire consisting of a sheet metal band surrounding the tire and of semi-circular cross section, and provided with a series of pins extending from each side thereof, apertured devices pivoted to said pins, stems extending across the rim of the wheel and having eyes at their ends, bolts passing through said eyes and screwed into said devices, and coiled springs surrounding said bolts and compressed between said eyes and said devices and bolt heads respectively.

In testimony whereof I have hereunto set my hand in the presence of two subscribing witnesses.

JULIUS BROTSCHNEIDER.

Witnesses:
 F. M. WRIGHT,
 D. B. RICHARDS.

Copies of this patent may be obtained for five cents each, by addressing the "Commissioner of Patents, Washington, D. C."